United States Patent

Wijard et al.

[15] 3,661,554
[45] May 9, 1972

[54] PROCESS FOR HARDENING AGGLOMERATED BODIES OF ORE CONCENTRATE IN A HIGH FREQUENCY ALTERNATING FIELD

[72] Inventors: Endel Wijard, Sodertalje; Jan Odsvall, Tyreso, both of Sweden

[73] Assignee: Aktiebolaget Elektrodius, Stockholm, Sweden

[22] Filed: Apr. 7, 1969

[21] Appl. No.: 814,191

[30] Foreign Application Priority Data

Apr. 11, 1968 Sweden......................................4992

[52] U.S. Cl......................................................75/3, 264/25
[51] Int. Cl. .................................................................C21b 1/20
[58] Field of Search......................................75/2–5; 264/25, 264/27

[56] References Cited

UNITED STATES PATENTS

| 3,261,959 | 7/1966 | Connell et al.....................264/25 UX |
| 833,005 | 10/1906 | Steinberg......................................75/3 |
| 933,270 | 9/1909 | Schumacher................................75/3 |
| 3,413,112 | 11/1968 | Dillon..........................................75/5 |
| 3,490,895 | 1/1970 | Svensson....................................75/3 |

FOREIGN PATENTS OR APPLICATIONS

| 672,137 | 5/1952 | Great Britain..........................264/27 |
| 517,798 | 2/1940 | Great Britain..............................75/3 |

*Primary Examiner*—Allen B. Curtis
*Attorney*—Young & Thompson

[57] ABSTRACT

When agglomerating ore concentrates the green agglomerated bodies lack strength and hardness to be handled and charged into the reducing furnaces. The process according to the present invention resides in the hardening of the green agglomerated bodies by exposing them to a high frequency alternating field and in a further hardening treatment by exposing the bodies so treated to a hydrothermal treatment at a high temperature and at a corresponding high pressure.

8 Claims, No Drawings

PROCESS FOR HARDENING AGGLOMERATED BODIES OF ORE CONCENTRATE IN A HIGH FREQUENCY ALTERNATING FIELD

When producing metal, ores of different kinds and aggregate forms are used. With the still further developed concentrating and dressing technique, poorer and poorer ores have come to be used and hence they have become still more finely ground, and therefore they are not well suited when in this pulverous state to be charged in the reduction furnaces.

It has therefore been necessary to agglomerate the pulverous ore. Sintering in pans or on conveyors has been common practice to provide a manageable lumping and clustering of the ore fines. Besides required fuel, also other additions were made in the sinter charge, e.g. to provide a self-fluxing sinter which means that it can be charged into the reducing furnace without further additions, especially with respect to special slag forming constituents to provide a predetermined composition of the furnace slag.

Another agglomerating process which lately has gained extended application, especially for iron ore concentrates, is the production of pellets from the concentrate by the rolling of finely ground ore concentrate in a somewhat inclined revolving drum which is charged with ore fines, humidifying agent(s), slag formers, if any, and bonding agent(s). In an untreated condition the green humid pellets thus obtained are not suited to be charged in a blast furnace, and they cannot either be handled or transported.

Briquettes which in any known manner have been produced from ore concentrate(s), humidifying agent(s), slag former, if any, and bonding agent(s) cannot either be handled or transported without after-treatment.

This after-treatment, which mainly concerns a hardening of the agglomerate, can be performed by drying, firing and/or sintering dependent on the bonding agent mixed into the initial mixture. Storing under humid conditions has also been proposed where hydraulic bonding agents, such as cement clinker, have been used.

In the U.S. Pat. No. 3,235,371 there is suggested the use of calcium hydroxide as bonding agent when agglomerating minerals, particularly in briquettes made of ore concentrates, whereby the briquettes are after-hardened by a hydrothermal treatment, i.e. a treatment with water vapor at a high pressure and a high temperature.

Ore concentrate has also been mixed with finely divided blast furnace slag, slacked line (calcium hydroxide) and sand, and the agglomerated bodies have thereafter been treated in steam of 120° C. succeeded by drying in sheds where the bonding agent of the agglomerate dries, hardens and bonds the constituents of the agglomerate together through the influence of the air, as disclosed in the U.S. Pat. No. 3,214,263.

All the processes mentioned above require considerable time and considerable storing volume and could adapt themselves to a continuous production, it is believed, only with difficulty and at a great expense.

To impart a sufficient strength to the agglomerate immediately after and in connection to its production is of vital importance for the proper handling and transportation of the agglomerates thus produced. Here the initially reached strength should be so high as to allow the agglomerates also to be stacked on top of each other without crushing or breaking into fragments.

According to the present invention this problem is solved in an elegant manner where the green agglomerates as e.g. pellets, briquettes, pieces or the like produced according to any known method out of ore concentrate, humidifying agent, slag former and bonding agent are carried through an alternating field of high frequency. Already within 3-5 seconds in the high frequency field e.g. pellets of iron ore obtain sufficient hardness to enable the pellets to be stacked or piled in layers of up to several decimeters in thickness.

This hardening takes place in a hitherto unexplained way, probably under the influence of eddy currents induced in the agglomerates when they are caused to pass through the high frequency alternating field.

According to the invention, the agglomerates are exposed to the action of the alternating field for so long time that the temperature of the agglomerate will rise to a predetermined value, preferably below 100°, particularly 90°-95° C.

According to the invention a further hardening of the agglomerates pretreated in the alternating field takes place by submitting the agglomerates to a hydrothermal treatment at high pressure at about 12.5-13 atmospheres gauge pressure and at a temperature of about 190° C., whereby the agglomerates thus obtained acquire a strength and hardness within 0.5-3 hours at said pressure and temperature, which entirely complies with the strength requirements for the agglomerates demanded in the reduction and smelting processes. The time for the hydrothermal treatment varies with factors such as the degree of fineness of the components, diameter of the agglomerates, etc.

The process according to the present invention has proved most suitable and advantageous when the agglomerates as sole bonding agent contain granulated, finely ground slag from some metallurgical smelting process. Especially good results have been reached with blast furnace slag as only bonding agent. Agglomerates of iron ore concentrate with finely divided blast furnace slag as sole bonding agent and treated according to the process of the invention have proved to obtain exceedingly good strength and therefore have been suitable for direct charging into a blast furnace or to be used as an addition in steel melting furnaces for the production of steel.

In order further to illustrate the process in accordance with the practice of the present invention, the following examples are provided. It will be understood, however, that these examples are given solely for the purpose of further illustration, and there is of course no intention in any respect to limit the scope of the process described above, and it will also be understood that the present invention is applicable for hardening any other agglomerate made up of any other ore concentrate or mixture of ore concentrates.

EXAMPLE 1

100 parts by weight of dressed magnetite ore concentrate having the composition shown below was dried and mixed with about 15 parts by weight of separately dried and ground blast furnace slag having a grain size of about 2,200–3,000 $cm^2/g$.

| | | | | |
|---|---|---|---|---|
| $Fe_3O_4$ | 94.12% | Fe | 71.26% | |
| $Fe_2O_3$ | 4.52% | Mn | 0.04% | |
| MnO | 0.05% | P | 0.10% | |
| CaO | 0.11% | Specific surface | | 950 $cm^2/g$. |
| MgO | 0.31% | Volume weight | | 2.6–3.3 g./$cm^3$ |
| $Al_2O_3$ | 0.27% | Density | | 5.1 g./$cm^3$ |
| $SiO_2$ | 0.46% | | | |
| $TiO_2$ | 0.16% | | | |
| $V_2O_5$ | 0.19% | | | |
| $P_2O_5$ | 0.02% | | | |
| S | 0.015% | | | |
| $CO_2$ | 0.14% | | | |
| $Na_2O$ | 0.05% | | | |
| $K_2O$ | 0.08% | | | |
| CuO | 0.01% | | | |

Slag composition:

| | | |
|---|---|---|
| $SiO_2$ | 35.7% | |
| $Al_2O_3$ | 12.4% | |
| $Fe_2O_3$ | 0.7% | |
| CaO | 42.8% | |
| MgO | 6.5% | Ratio $CaO/SiO_2 = 1.20$ |
| $K_2O$ | 0.9% | |
| $Na_2O$ | 0.6% | |
| S | 0.8% | |
| $SO_3$ | 0.1% | |
| Cl | traces | |
| | 100.4% | |

The mixed pulverous material was carried on a conveyor belt to a roll disc inclined 45°. Hot water (35°-60° C.) in an amount of 12-17 parts by weight, basis weight of ore concentrate, was sprayed through spray nozzles located above the pelletizing disc where the addition of water is dependent on the grain sizes of the pulverous components. The soft ore pellets thus obtained were transferred from the disc to a conveyor belt of electrically nonconductive material, e.g. rubber or the like, the conveyor belt being arranged to feed the pellets distributed to a spaced relationship on the belt through a electromagnetic high frequency alternating field produced by means known per se. The main direction of the produced field was horizontally arranged relative to the conveyor belt to convey the fresh pellets on the belt through the induction coil.

The high frequency device was fed with an input power of 4–6kW, and the induction coil with a frequency of about 1 MHz. The conveying speed of the belt being variable, the time of treatment of the pellets could be regulated. Sufficient heating and hardening effect was obtained in pellets having 15–20 mm diameter after about 3–5 seconds in the alternating high frequency field.

For other ore concentrates times, other input power and frequencies of similar order of magnitude may be employed. The pellets, which probably have been influenced by eddy currents induced therein, were transferred to low-sided, basket-like net containers or to flat-bottomed metal cases. After treatment in the high frequency alternating field, the pellets had acquired a strength to permit piling or stacking in layers several decimeters in thickness without any risk of crushing prevailing. Containers of the kind filled with pellets were in their turn piled or stacked on top of each other on a carriage provided with rollers or wheels and a batch which in practice may comprise several tons of pellets was conveyed along for further hardening by means of hydrothermal treatment in an autoclave.

After closing the autoclave it was filled with entirely saturated or partially unsaturated water vapor to successively raise the pressure in the autoclave to 12 atmospheres gauge pressure. This pressure level was maintained during 0.5–3 hours depending on the strength requirements that the end product had to comply with.

The pressure in the autoclave was then equalized to surrounding pressure by blowing off the excess pressure as rapidly as practically possible, i.e. for about 30 minutes or longer.

The examination showed that the strength of the slag-bonded pellets increased from a few kp per pellet after the treatment in the alternating field to 60–100 kp per pellet after the hydrothermal treatment in the autoclave.

EXAMPLE 2

100 parts by weight of ore concentrate with the analysis given below were mixed with 12 parts by weight of granulated and finely ground slag with an analysis as in Example 1, further with 2.5 parts by weight of finely ground limestone and 0.5 parts by weight of magnesium carbonate likewise ground, and the ingredients were thoroughly mixed.

Ore concentrate analysis

| | | | | | |
|---|---|---|---|---|---|
| $Fe_3O_4$ | 74.79% | Fe | 65% | | |
| $Fe_2O_3$ | 15.49% | Mn | 0.18% | | |
| MnO | 0.23% | P | 0.64% | | |
| CaO | 2.44% | F | 0.13% | | |
| MgO | 1.01% | Specific surface | | 50 cm.$^2$/g. | |
| $Al_2O_3$ | 0.63% | Volume weight | | 2.6–2.9 g./cm.$^3$ | |
| $SiO_2$ | 3.39% | Density | | 4.8 g./cm.$^3$ | |
| $TiO_2$ | 0.18% | | | | |
| $V_2O_5$ | 0.27% | | | | |
| $P_2O_5$ | 1.47% | | | | |
| S | 0.002% | | | | |
| $Na_2O$ | 0.14% | | | | |
| $K_2O$ | 0.15% | | | | |
| | 100.19% | | | | |

The finely ground limestone may advantageously consist of pulverulent waste material obtained as by-product when crushing said mineral to a certain desired lump size. For the pelletizing the finely ground limestone should, however, be of such a fineness as to exhibit a specific surface according to Blaine of 2,500–3,500 cm.$^2$/g to an extent of at least 90 percent. The finely ground limestone may, if necessary, be substituted by about 3 percent of dolomite or entirely by finely ground magnesite. From said mixture ore pellets were produced in the same way as in Example 1. The power requirement for treatment in the high frequency alternating field was, however, increased by about 20 percent on account of the partially nonmagnetic constituent introduced into this mixture and owing to the reduced bonding agent content in the form of slag, pellets were obtained whose strength was about 10 percent lower after the hydrothermal treatment as compared with Example 1.

Similar and equally good results have been obtained with a mixture of different ore concentrates, one of them being an iron ore concentrate, e.g. a mixture of iron ore and nickel, molybdenum, vanadium, titanium, tungsten, niobium or tantalum ore concentrates or a suitable combination of any of them as well as with nonferrous ore concentrates or a mixture of nonferrous ore concentrates, e.g. zinc ore concentrate or a mixture consisting of copper and zinc ore concentrates.

Thus the present invention has a given application to harden agglomerates agglomerated of one ore concentrate or of mixtures of ore concentrates.

The process according to the invention for the hardening of agglomerated bodies, particularly pellets, briquettes or the like by first exposing them to the influence of a high frequency alternating field and thereafter subjecting the agglomerates to a hydrothermal treatment yields, in addition to the advantage of obtaining suitable agglomerates for the reduction or smelting processes at lower costs, also an indirect advantage regarding the slag handling in the reduction processes and may be a suitable disposition of the constituents in the agglomerates lead to an extensive reduction of the limestone or dolomite consumption, particularly in the production of pig iron out of iron ore concentrates.

What we claim is:

1. In a process for manufacturing hard bodies from an agglomerated mass of an ore concentrate also comprising a humidifying agent, a slag former and a binding agent; the improvement comprising agglomerating said mass then exposing said agglomerated mass to a high frequency alternating field thereby to heat and harden said mass, and discontinuing said exposure before the temperature of the agglomerated mass exceeds 100° C.

2. A process as claimed in claim 1, and thereafter exposing said hardened bodies, while still heated from exposure to said field, to a hydrothermal treatment at a temperature of about 190° C. and elevated pressure to harden said bodies additionally.

3. A process as claimed in claim 1, in which said ore concentrate is an iron ore concentrate.

4. A process as claimed in claim 3, in which said concentrate includes an ore concentrate selected from the group consisting of nickel, molybdenum, vanadium, titanium, tungsten, niobium, tantalum, and a mixture thereof.

5. A process as claimed in claim 1, said ore concentrate being selected from the group consisting of zinc and copper and a mixture thereof.

6. In a process for manufacturing hard bodies from an agglomerated mass of an ore concentrate also comprising a humidifying agent, a slag former, and as the sole bonding agent a finely divided slag obtained from a metallurgical melting process; the improvement comprising agglomerating said mass, then exposing said agglomerated mass to a high frequency alternating field thereby to heat and harden said mass, and discontinuing said exposure before the temperature of the agglomerated mass exceeds 100° C.

7. A process as claimed in claim 6, said bonding agent being a blast furnace slag.

8. A process as claimed in claim 6, and thereafter exposing said hardened bodies, while still heated from exposure to said field, to a hydrothermal treatment at a temperature of about 190° C. and elevated pressure to harden said bodies additionally.

* * * * *